United States Patent
Tschirhart

(10) Patent No.: US 9,906,128 B2
(45) Date of Patent: Feb. 27, 2018

(54) INTERMEDIATE VOLTAGE BUS CONVERTER WITH POWER SAVING MODES

(71) Applicant: Infineon Technologies Austria AG, Villach (AT)

(72) Inventor: Darryl Tschirhart, Torrance, CA (US)

(73) Assignee: Infineon Technologies Austria AG, Villach (AT)

( * ) Notice: Subject to any disclaimer, the term of this patent is extended or adjusted under 35 U.S.C. 154(b) by 463 days.

(21) Appl. No.: 14/526,812

(22) Filed: Oct. 29, 2014

(65) Prior Publication Data

US 2016/0126837 A1   May 5, 2016

(51) Int. Cl.
*H02M 3/158*   (2006.01)
*H02M 1/00*   (2006.01)

(52) U.S. Cl.
CPC ......... *H02M 3/158* (2013.01); *H02M 3/1584* (2013.01); *H02M 2001/007* (2013.01); *H02M 2001/0032* (2013.01); *Y02B 70/16* (2013.01)

(58) Field of Classification Search
CPC ...... H02M 3/155; H02M 3/156; H02M 3/157; H02M 3/158; H02M 3/1584;
(Continued)

(56) References Cited

U.S. PATENT DOCUMENTS 5,568,044 A   10/1996   Bittner
6,198,642 B1 *   3/2001   Kociecki ............. H02M 1/4225
                                                          307/150

(Continued)

FOREIGN PATENT DOCUMENTS

CN   101667019 A   3/2010
CN   102710113 A   10/2012
(Continued)

OTHER PUBLICATIONS

"Motor Control PWM", Microchip Technology, Inc., DS70187E, dsPIC33F/PIC24H Family Reference Manual, Section 14, pp. 1-56, Publication date not known, downloaded from http://ww1.microchip.com/downloads/en/DeviceDoc/70187E.pdf on Aug. 19, 2015.

(Continued)

*Primary Examiner* — Emily P Pham
*Assistant Examiner* — Shahzeb K Ahmad
(74) *Attorney, Agent, or Firm* — Murphy, Bilak & Homiller, PLLC

(57) ABSTRACT

A DC/DC voltage converter includes a first stage operable to convert a first DC voltage rail to a second DC voltage rail different than the first DC voltage rail and a second stage operable to convert the second DC voltage rail to a third DC voltage rail lower than the second DC voltage rail and deliver current to a load at the third DC voltage rail, the amount of current delivered to the load corresponding to an operating set point of the second stage. The second stage is operable to change its operating set point responsive to a command received from the load, such that the amount of current delivered to the load is reduced. The first stage is operable to change its operating set point responsive to a command issued by the load, such that the amount of current delivered to the second stage is reduced.

28 Claims, 7 Drawing Sheets

(58) Field of Classification Search
CPC ......... H02M 3/1588; H02M 2001/007; H02M 2001/0074; H02M 2001/0077; H02M 2001/008; H02M 2001/0032; H02M 2001/0019; Y02B 70/1466; Y02B 70/16
See application file for complete search history.

(56) References Cited

U.S. PATENT DOCUMENTS

| | | | |
|---|---|---|---|
| 6,278,263 B1 | 8/2001 | Walters et al. | |
| 6,911,848 B2 | 6/2005 | Vinciarelli | |
| 7,026,800 B2 | 4/2006 | Liu et al. | |
| 7,053,713 B1 | 5/2006 | Dening | |
| 7,109,689 B2 | 9/2006 | Schneider | |
| 7,161,335 B2 | 1/2007 | Wei et al. | |
| 7,380,146 B2* | 5/2008 | Swope | G06F 1/26 713/300 |
| 7,383,145 B2 | 6/2008 | Tabaian et al. | |
| 7,466,116 B2 | 12/2008 | Sato et al. | |
| 7,479,772 B2 | 1/2009 | Zane et al. | |
| 7,489,117 B2 | 2/2009 | Jain | |
| 7,688,046 B2* | 3/2010 | Li | H02J 1/08 323/266 |
| 7,777,461 B2 | 8/2010 | Martin et al. | |
| 8,030,908 B2 | 10/2011 | Huang | |
| 8,120,205 B2 | 2/2012 | Heineman | |
| 8,190,932 B2 | 5/2012 | Rui | |
| 8,232,782 B2 | 7/2012 | Houston et al. | |
| 8,237,423 B2 | 8/2012 | Heineman et al. | |
| 8,242,759 B2 | 8/2012 | Carroll et al. | |
| 8,330,439 B2 | 12/2012 | Wu | |
| 8,471,542 B2 | 6/2013 | Lipiansky et al. | |
| 8,638,571 B2 | 1/2014 | Tschirhart et al. | |
| 8,710,810 B1 | 4/2014 | McJimsey et al. | |
| 8,803,492 B2 | 8/2014 | Liu | |
| 8,901,908 B2 | 12/2014 | Tang et al. | |
| 9,093,862 B2* | 7/2015 | Dennis | H02J 1/10 |
| 9,178,421 B2* | 11/2015 | Dally | H02M 3/158 |
| 9,214,858 B2 | 12/2015 | Holmberg et al. | |
| 9,231,477 B2 | 1/2016 | Dally | |
| 9,312,767 B2 | 4/2016 | Sandner et al. | |
| 9,331,565 B2* | 5/2016 | Wei | H02M 1/36 |
| 9,350,244 B2 | 5/2016 | Tang et al. | |
| 9,443,431 B1 | 9/2016 | Laird et al. | |
| 2005/0094330 A1* | 5/2005 | Guenther | H02J 1/102 361/18 |
| 2005/0184590 A1* | 8/2005 | Dobbs | G06F 1/26 307/43 |
| 2005/0184713 A1* | 8/2005 | Xu | H02M 3/156 323/282 |
| 2005/0240814 A1 | 10/2005 | Sasakura et al. | |
| 2007/0103136 A1 | 5/2007 | Jain | |
| 2009/0039843 A1* | 2/2009 | Kudo | H02M 3/1584 323/272 |
| 2009/0296432 A1 | 12/2009 | Chapuis | |
| 2010/0176782 A1 | 7/2010 | Kudo | |
| 2010/0320983 A1 | 12/2010 | Wu | |
| 2011/0025289 A1* | 2/2011 | Wang | H02M 1/4225 323/285 |
| 2011/0050190 A1* | 3/2011 | Avrutsky | H02M 3/158 323/282 |
| 2011/0241640 A1 | 10/2011 | Qiu et al. | |
| 2011/0289335 A1 | 11/2011 | Lipiansky et al. | |
| 2012/0223691 A1* | 9/2012 | Weinstein | H02M 1/44 323/283 |
| 2012/0223693 A1 | 9/2012 | Tang et al. | |
| 2013/0020870 A1 | 1/2013 | Li et al. | |
| 2013/0027009 A1 | 1/2013 | Tang et al. | |
| 2013/0335043 A1 | 12/2013 | He et al. | |
| 2014/0159681 A1 | 6/2014 | Oraw et al. | |
| 2015/0015219 A1 | 1/2015 | Ishino et al. | |
| 2015/0326120 A1 | 11/2015 | Kelin et al. | |
| 2015/0340949 A1* | 11/2015 | Holmberg | H02M 3/157 323/271 |
| 2015/0349634 A1 | 12/2015 | Tschirhart et al. | |
| 2015/0367735 A1 | 12/2015 | Baker et al. | |
| 2016/0105108 A1 | 4/2016 | Childs et al. | |
| 2016/0126837 A1 | 5/2016 | Tschirhart | |
| 2016/0149489 A1 | 5/2016 | Tang et al. | |
| 2016/0226385 A1 | 8/2016 | Phadke | |
| 2016/0241126 A1* | 8/2016 | Vaidya | H02M 3/158 |
| 2016/0259353 A1 | 9/2016 | Morroni | |
| 2016/0266639 A1 | 9/2016 | Doering | |

FOREIGN PATENT DOCUMENTS

| | | |
|---|---|---|
| CN | 103280974 A | 9/2013 |
| CN | 103856079 A | 6/2014 |
| KR | 1020050071685 A | 7/2005 |
| KR | 100667288 B1 | 1/2007 |
| TW | 201435537 A | 9/2014 |

OTHER PUBLICATIONS

"UCC28950 Green Phase-Shifted Full-Bridge Controller With Synchronous Rectification", Texas Instruments, SLUSA16B, Mar. 2010, Revised Oct. 2011, pp. 1-47.

"UCC38C40 BiCMOS Low-Power Current-Mode PWM Controller", Texas Instruments, SLUS458E, Aug. 2001, Revised Oct. 2010, pp. 1-32.

"UCD3138 Highly Integrated Digital Controller for Isolated Power", Data Manual, Texas Instruments, Literature No. SLUSAP2F, Mar. 2012, Revised Nov. 2013, pp. 1-78.

Unknown, Author, "Multi Phase DC-DC Converter Efficiency Based Phase Optimization", an IP .com Prior Art Database Technical Disclosure, IPCOM000238748D, Sep. 16, 2014, p. 1.

Siemens, et al., "Scaled Size Frequency Multiphase Converter", IP.com, IPCOM000031287D, Electronic Publication Date: Sep. 21, 2004, Siemens AG, Oct. 25, 2004, p. 1.

Unknown, Author, "STIC Search Report; EIC 2800", Received from searcher John DiGeronimo, STIC Database Tracking No. 522241, U.S. Appl. No. 14/830,430, filed Aug. 31, 2016, Office Action dated Nov. 3, 2016 in U.S. Appl. No. 14/830,430, pp. 1-13.

* cited by examiner

INTERMEDIATE VOLTAGE BUS CONVERTER WITH POWER SAVING MODES

TECHNICAL FIELD

The present application relates to intermediate DC/DC voltage bus converters, in particular entering and exiting power saving modes by intermediate DC/DC voltage bus converters.

BACKGROUND

To save power in datacenters and other data-intensive applications, a typical 12V DC distribution bus can be replaced by a higher voltage bus e.g. typically 48V nominal. This higher distribution voltage is stepped down on the motherboard in one or more stages to the low DC voltage required by the CPU (central processing unit), memory, and other electronic components included in the system such as memory, graphics logic, I/O (input/output), etc. For example, a single DC/DC converter conventionally generates an intermediate bus voltage that is fed to all lower-voltage converter stages. The intermediate bus is typically between 5-12V and can therefore use existing infrastructure to be highly scalable. In another example, the CPU has a dedicated converter (e.g. 48V to 1V) that can be a single conversion stage, or two converter stages in series to achieve the step down. The other voltage rails (e.g. memory, graphics logic, etc.) are fed from a common intermediate bus. In still another example, all voltage rails are fed directly from the 48V distribution bus. In this case scalability is limited, and the use of existing infrastructure is not an option. Other architectures employ multiple intermediate bus voltages for feeding different voltage rails, using direct conversion for the CPU and some other voltage rails with the intermediate bus powering the rest, or some combination thereof.

In each case, the final conversion stage of the DC/DC converter that supplies the CPU is widely known as a voltage regulator. The voltage regulator converts an intermediate voltage e.g. 12V to the CPU voltage e.g. 1V. The CPU communicates with the voltage regulator using a protocol for status, protection, and system optimization. Part of the optimization includes instructing the voltage regulator to enter power saving modes of operation to increase light-load efficiency when the CPU enters low power states. However, a problem occurs with higher-voltage distribution systems such as 48V systems when the converter stage that converts the high distribution bus voltage to an intermediate bus voltage is not privy to the communication between the CPU and the voltage regulator that converts between the intermediate bus voltage and the load voltage. For example in a 48V system, the 48V-to-12V converter stage monitors its output current and adjusts its operating point (e.g. active phases, pulse frequency modulation (PFM) mode, etc.) accordingly. However, if the voltage regulator is still in the most active power state but the 48V-to-12V converter stage enters a low power mode, the slow response of the 48V-to-12V converter stage can feed through to the CPU voltage rail when a transient occurs. Such a condition would result in a CPU hang which is prohibited in a server where high reliability is a fundamental necessity.

This problem has been solved by increasing the intelligence of the converter stage that converts the high distribution bus voltage to an intermediate bus voltage. For example, this intermediate converter stage can measure its output voltage and current, and make decisions to enter power-saving states based on those measurements. Detection of a transient event may cause the intermediate converter stage to leave the power saving state by adding phases (if applicable) or leaving pulse frequency modulation (PFM) mode and entering PWM (pulse width modulation) mode. However, to maintain high efficiency, converters on a higher-voltage distribution bus such as a 48V bus typically switch at lower frequencies than the downstream lower voltage regulators that feed the CPUs. Further, the filter inductance of these higher-voltage converter stages is significantly larger than that of the downstream voltage regulators, by more than an order of magnitude. As such, their response is significantly slower.

During low current intervals in the maximum power state, it is possible that a voltage regulator sheds phases to conserve power. The multiple phases, high switching frequency, and low inductance promote fast reaction time to allow the voltage regulator to respond quickly to a load transient without the CPU voltage experiencing undershoot. However, the response of the upstream higher-voltage converter stage is significantly slower than the voltage regulator. Therefore, if the converter stage that converts the high distribution bus voltage to the intermediate bus voltage enters a power saving state while the CPU is still in the maximum power state, the slow response of this intermediate converter stage generates a sag on the intermediate voltage input to the voltage regulator which in turn propagates and manifests itself as undershoot at the CPU.

SUMMARY

According to an embodiment of a DC/DC voltage converter, the DC/DC voltage converter comprises a first stage operable to convert a first DC voltage rail to a second DC voltage rail different than the first DC voltage rail and a second stage operable to convert the second DC voltage rail to a third DC voltage rail lower than the second DC voltage rail and deliver current to a load at the third DC voltage rail, the amount of current delivered to the load corresponding to an operating set point of the second stage. The second stage is operable to change its operating set point responsive to a command received from the load, such that the amount of current delivered to the load is reduced. The first stage is operable to change its operating set point responsive to a command issued by the load, such that the amount of current delivered to the second stage is reduced.

According to an embodiment of a server, the server comprises a central processing unit (CPU), memory coupled to the CPU, a DC/DC voltage converter for powering the CPU and the memory, a communication bus for coupling the CPU to the memory and the DC/DC voltage converter and a DC voltage distribution bus coupled to the DC/DC voltage converter. The DC/DC voltage converter comprises a first stage operable to convert a first DC voltage rail provided by the DC voltage distribution bus to a second DC voltage rail different than the first DC voltage rail and a second stage operable to convert the second DC voltage rail to a third DC voltage rail lower than the second DC voltage rail and deliver current to the CPU at the third DC voltage rail, the amount of current delivered to the CPU corresponding to an operating set point of the second stage. The second stage is operable to change its operating set point responsive to a command received from the CPU, such that the amount of current delivered to the CPU is reduced. The first stage is operable to change its operating set point responsive to a command issued by the CPU, such that the amount of current delivered to the second stage is reduced.

Those skilled in the art will recognize additional features and advantages upon reading the following detailed description, and upon viewing the accompanying drawings.

BRIEF DESCRIPTION OF THE FIGURES

The elements of the drawings are not necessarily to scale relative to each other. Like reference numerals designate corresponding similar parts. The features of the various illustrated embodiments can be combined unless they exclude each other. Embodiments are depicted in the drawings and are detailed in the description which follows.

DETAILED DESCRIPTION

Embodiments described herein relate to a DC/DC converter that includes a first stage for converting a high bus voltage to an intermediate bus voltage and a second stage for converting the intermediate bus voltage to a low bus voltage that supplies a load such as a CPU. The load communicates with the DC/DC converter using a protocol for status, protection, and system optimization. Part of the optimization process includes the load instructing the second stage to change its operating set point so that the light-load efficiency of the second stage can be increased when the load enters a lower-power state. The first stage is aware of the power saving intentions of the load, e.g. by monitoring the communication between the load and the second stage, or by receiving communications directly from the load. In response, the first stage changes its operating set point such that the amount of current delivered to the second stage is reduced. In this way, the first stage implements an anticipatory power savings approach as opposed to a reactionary approach that merely relies on observation of system parameters such as bus voltage, output current, etc. The first stage of the DC/DC converter is therefore less likely to hinder operation of the second stage, and hence, load performance.

Figure 1:
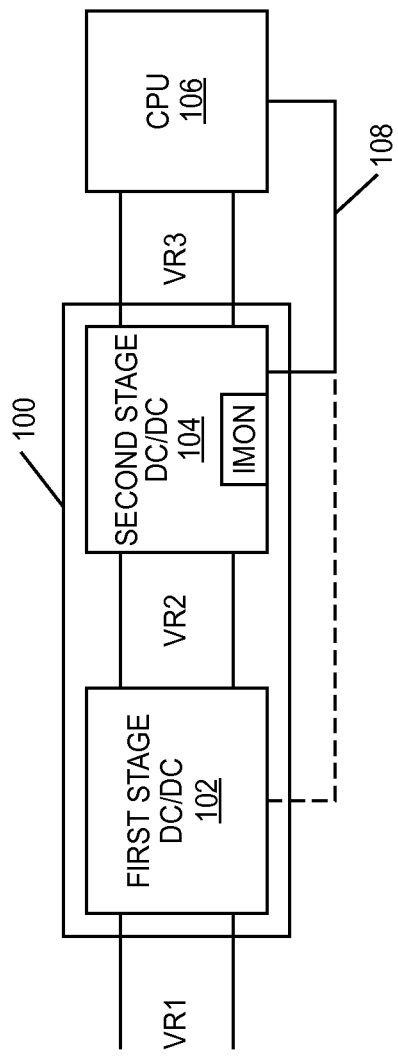
FIG. 1 illustrates a block diagram of an embodiment of a DC/DC converter that includes a first stage for converting a high bus voltage to an intermediate bus voltage and a second stage for converting the intermediate bus voltage to a low bus voltage that supplies a load.

FIG. 1 illustrates an embodiment of the DC/DC converter 100. The DC/DC voltage converter 100 comprises a first stage 102 for converting a first DC voltage rail (VR1) to a second DC voltage rail (VR2) different than the first DC voltage rail. The level of the second DC voltage rail VR2 can be lower or higher than the first DC voltage rail VR1. For example, 48V is the nominal voltage for systems that can vary from 35-75V for VR1. So in one embodiment VR1 is at 48V (but can be 35-75V) and VR2 is at 12V. In another embodiment, VR1 again is at 48V but the second rail VR2 can be 54V. In general, the second DC voltage rail VR2 is different than the first DC voltage rail VR1.

The DC/DC voltage converter 100 further comprises a second stage 104 for converting the second DC voltage rail VR2 to a third DC voltage rail (VR3) lower than the second DC voltage rail VR2. The second stage 104 delivers current to a load 106 such as a CPU at the third DC voltage rail VR3. The amount of current delivered to the load 106 corresponds to the operating set point of the second stage 104, and the operating set point of the second stage 104 in turn corresponds to the amount of current required by the load 106.

The second stage 104 of the DC/DC converter 100 can change its operating set point responsive to a command received from the load 106 powered by the DC/DC converter 100, such that the amount of current delivered to the load 106 is reduced. For example in the case of a CPU load, the CPU communicates with the second stage 104 over a communication bus 108 using a protocol for status, protection, and system optimization. Part of the optimization process includes the CPU instructing the second stage 104 to change its operating set point so that the light-load efficiency of the second stage 104 is increased when the CPU enters a low power state. This can include, but is not limited to, phase shedding where the second stage 104 deactivates or sheds (drops) one or more previously active phases, dynamic reduction in the output voltage of the second stage 104, transitioning the second stage 104 from PWM to PFM operation, etc. Any standard communication protocol can be used by the load 106 to communicate commands to the second stage 104 of the DC/DC converter 100 which cause the second stage 104 to change its operating set point and correspondingly lower its power output. For example through the SVID (serial VID) interface, the load 106 is a CPU that can dynamically control the output voltage, slew rates and power states of the second stage 104, as well as monitor the second stage 104 for telemetry purposes.

The first stage 102 of the DC/DC converter 100 also can change its operating set point responsive to a command issued by the load 106, such that the amount of current delivered to the second stage 104 is reduced. The first stage 102 has insight into the power consumption behavior of the downstream load 106. In one embodiment, the load 106 is a CPU that communicates with the second stage 104 by transmitting communication packets over a communication bus 108. The packets are addressed to the second stage 104. The second stage 104 extracts commands from the packets, and takes corresponding action. This can include taking one or more power saving-related actions such as phase shedding, dynamic output voltage reduction, transitioning the second stage 104 from PWM to PFM operation, etc.

In one embodiment, the first stage 102 of the DC/DC converter 100 monitors the communication bus 108 between the second stage 104 and the load 106 for a command addressed to the second stage 104 that instructs the second stage 104 to change its operating set point. The load 106 actively controls the power state of second stage 104, and the first stage 102 decides whether to change its operating point based on power state instructions to the second stage 104. The load 106 does not directly communicate with the first stage 102 according to this embodiment.

The first stage 102 can change its operating set point responsive to commands addressed to the second stage 104, when the amount of current required by the second stage 104 is reduced. If the first stage 102 has more than one phase, this can include phase shedding where the first stage 102 deactivates or sheds (drops) one or more previously active phases. Alternatively or in addition, the first stage 102 can dynamically reduce its output voltage, transition from PWM to PFM operation, etc. For example, if the load 106 issues a command to enter a lower power state that results in the second stage 104 shedding phases, the first stage 102 can then know what its maximum load is limited to and could potentially shed phases as well if it were safe to do so. If the load 106 issues a command to put the second stage 104 to sleep, the first stage 102 can also enter its most efficient mode of operation where the term 'most efficient mode of operation' is not limited to phase shedding or PFM operation. From a system perspective, this could include the first stage 102 adjusting the second DC voltage rail (VR2) to minimize losses. To maintain the highest level of load power quality, when the load 106 instructs the second stage 104 to leave a power saving mode of operation and return to the maximum power state, the first stage 102 of the DC/DC converter 100 is aware of the command and can enter its own maximum power state in response.

In another embodiment, the first stage 102 of the DC/DC converter 100 can be coupled to the load 106 via the same or different communication bus 108 as the second stage 104 and receive packets with commands addressed to the first stage 102. According to this embodiment, the load 106 can send messages independently to both the second stage 104 and first stage 102 of the DC/DC converter 100. This way, the first stage 102 need not necessarily monitor for commands addressed to the second stage 104 which instruct the second stage 104 to take power saving action. Instead, the load 106 can communicate directly with the first stage 102 by addressing power saving commands to the first stage 102. The first stage 102 can change its operating set point responsive to a power saving command received over the communication bus 108 and addressed to the first stage 102 e.g. by phase shedding, entering PFM operation, adjusting the second DC voltage rail (VR2) to minimize losses, etc. The dashed line in FIG. 1 indicates that the first stage 102 can monitor the communication bus 108 between the load 106 and the second stage 104 or receive packets from the load 106 uniquely addressed to the first stage 102, in order to gain insight into the power consumption behavior of the downstream load 106.

Figure 2:
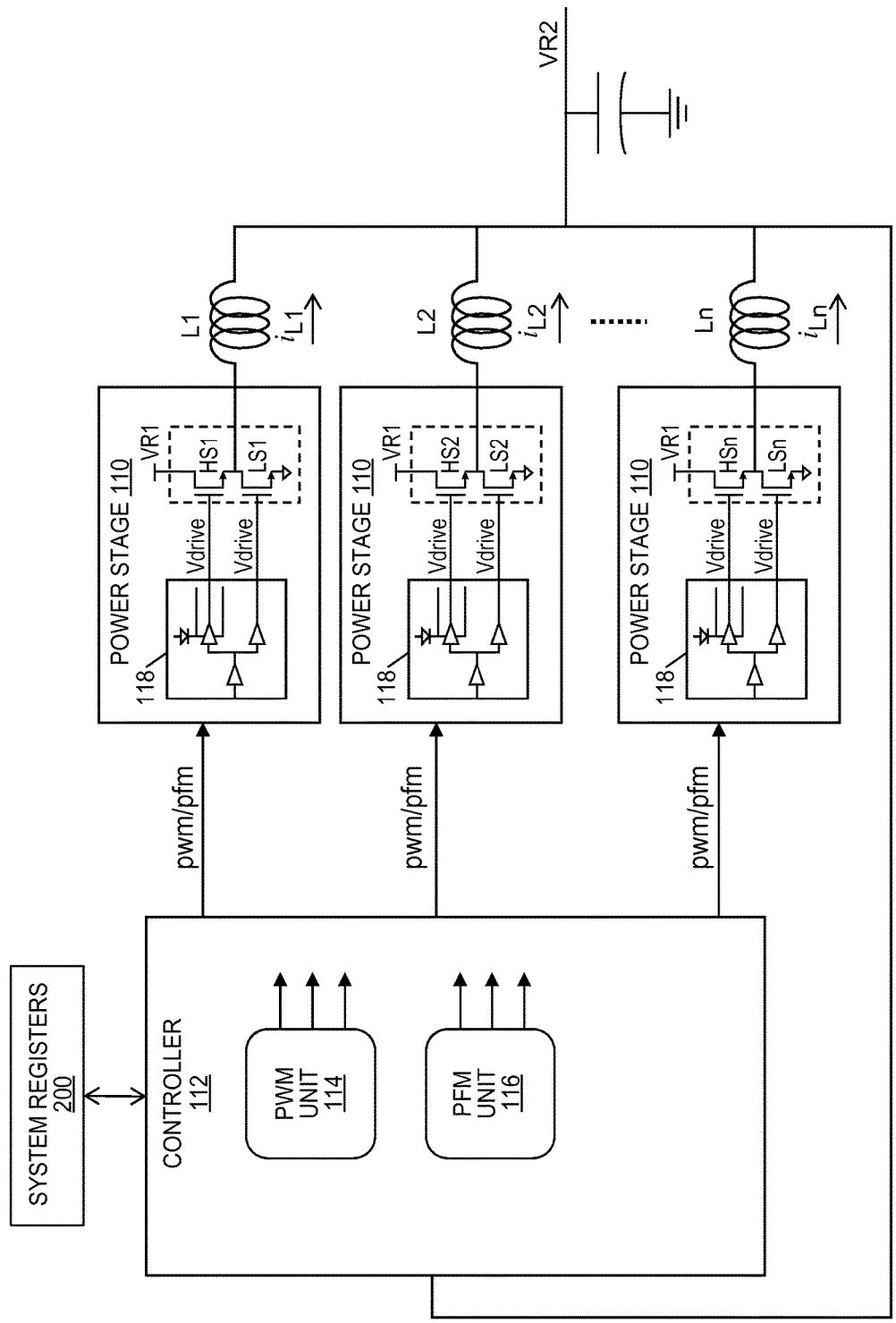
FIG. 2 illustrates a more detailed block diagram of the DC/DC converter shown in FIG. 1.

FIG. 2 illustrates an embodiment of the first stage 102 of the DC/DC converter 100. The first stage 102 comprises a plurality of power stages (phases) 110 and a controller 112 such as a microcontroller, microprocessor, ASIC (application-specific integrated-circuit), etc. for controlling operation of the power stages 110. Each power stage 110 is operable to deliver a phase current ($i_{Ln}$) through a separate inductor ($L_n$) to yield the second DC voltage rail VR2. In the case of a multiphase buck converter for implementing the first stage 102 as shown in FIG. 2, the first stage 102 produces a DC voltage rail VR2 less than VR1. In general, the first stage 102 can be implemented using any standard DC/DC converter architecture such as buck-boost converter, flyback converter, etc. such that the second DC voltage rail VR2 can be lower or higher than the first DC voltage rail VR1.

Each power stage 102 of the multiphase buck converter shown in FIG. 2 has a high-side transistor (HSn) and a low-side transistor (LSn) for coupling to the second DC voltage rail VR2 through the corresponding inductor. The high-side transistor of each power stage 110 switchably connects the second DC voltage rail VR2 to the first DC voltage rail VR1, and the corresponding low-side transistor switchably connects the second DC voltage rail VR2 to ground at different periods. N power stages 110 are shown in FIG. 2. The first stage 102 can include any number of power stages 110 including a single power stage (phase) or more than one power stage (i.e. multi-phase where each power stage is one phase of the multi-phase regulator). In many cases, the first stage 102 switches at a lower frequency than the second stage 104 of the DC/DC converter 100. The first stage 102 can have a lower phase count than the second stage 104, and larger inductors. As a result, the first stage 102 typically has a slower inherent response time to transient conditions as compared to the second stage 104. The second stage 104 of the DC/DC converter 100 can have the same or similar construction as the first stage 102.

The controller 112 of the DC/DC converter 100 regulates the second DC voltage rail VR2 delivered by the power stage(s) 110, by adjusting the phase currents delivered by the power stage(s) 110. Each phase 110 is configured to output a maximum rated current at the second DC voltage rail. The controller 112 includes a pulse width modulator (PWM) unit 114 for switching each power stage 110 via a corresponding PWM control signal (pwm). The controller 112 also includes a pulse frequency modulator (PFM) unit 116 for switching one of the power stages 110 via a corresponding PFM (pfm) control signal e.g. during light-load operation. Drivers 118 for the power stage(s) 110 provide gate drive signals (Vdrive) to the gates of the corresponding high-side and low-side transistors in response to the PWM or PFM control signals provided by the controller 112.

The controller 112 can manage changes from one reference voltage to another. The controller 112 also can determine errors between the second DC voltage rail VR2 and a reference voltage, and convert the error voltage into a digital representation provided to the PWM and PFM units 114, 116 for modifying the switching cycle of each power stage 110 e.g. by adjusting the PWM duty cycle in PWM mode or switching frequency in PFM mode.

Figure 3:
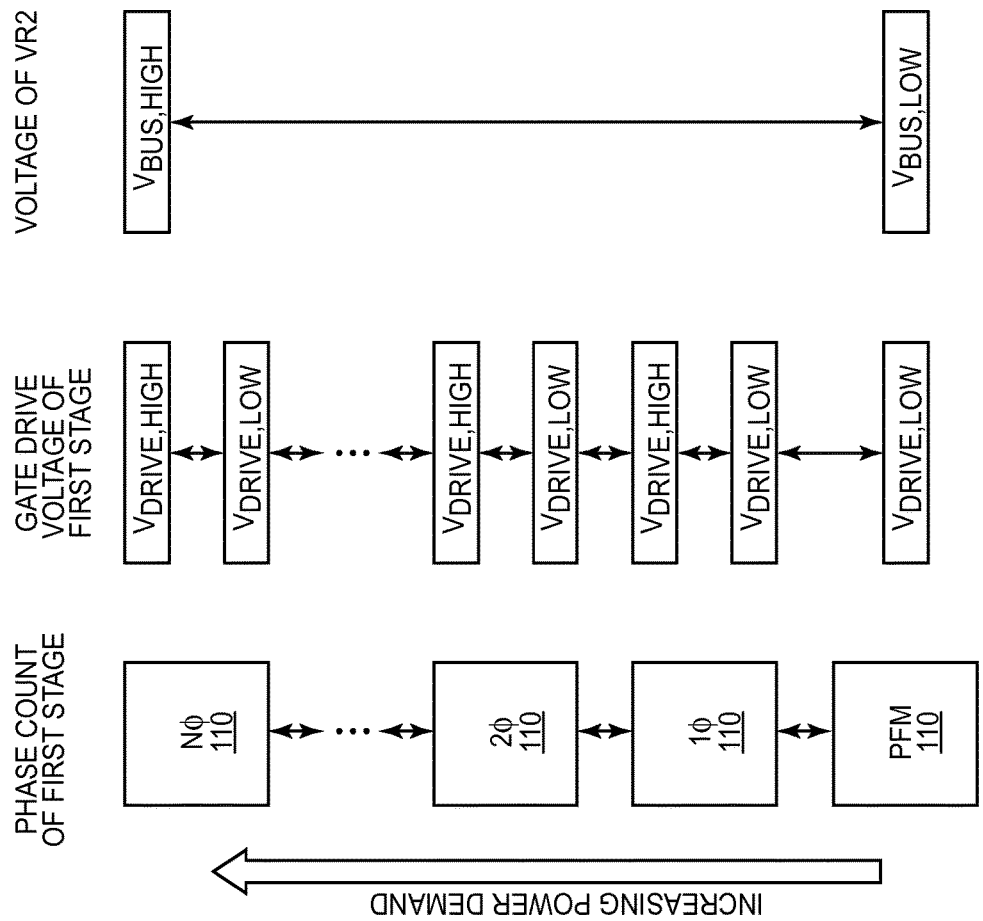
FIG. 3 illustrates examples of different operating set point changes that can be made by the first stage of the DC/DC converter shown in FIGS. 1 and 2, in response to commands issued by the load which indicate a change in power demand at the load.

FIG. 3 illustrates examples of different operating set point changes that can be made by the first stage 102 of the DC/DC converter 100 in response to commands issued by the load 106 which indicate a change in power demand at the load 106. The operating set point changes available at the first stage 102 depend on the architecture of the first stage 102. For example, if the first stage 102 has more than one phase (power stage) 110, the first stage 102 can shed (deactivate) one or more phases 110 in response to a command from the load 106 indicating a reduced power state at the load 106. With only one phase 110 active, the first stage 102 can transition from PWM mode to PFM mode for that phase 110. The PWM-to-PFM mode change option is available even if the first stage 110 has only one phase (i.e. is a single-phase stage).

In addition or alternatively, the first stage 102 can change the gate drive signals (Vdrive) applied to the gates of the high-side and low-side transistor of each active phase 110 from a higher voltage (Vdrive,high) to a lower voltage (Vdrive,low) in response to a command from the load 106 indicating a reduced power state at the load 106.

In yet another embodiment, the first stage 102 can change the level of the second DC voltage rail VR2 from a higher voltage (Vbus,high) to a lower voltage (Vbus,low) in response to a command from the load 106 indicating a reduced power state at the load 106. For example, the first stage 102 can increase or decrease the level of the second DC voltage rail VR2 responsive to the second stage 104 being instructed by the load 106 to shed one or more phases, each phase of the second stage 104 configured to output a maximum rated current at the third DC voltage rail VR3. The first stage 102 can change the level of the second DC voltage rail VR2 for each active phase 110, and can perform this level adjustment to VR2 each time a phase 110 is shed.

Each of the operating set point changes shown in FIG. 3, alone or in any combination, allows the first stage 102 of the DC/DC converter 100 to adjust its operating set point when the current required by the second stage 104 is reduced in response to power saving commands issued by the load 106. The commands can be addressed to the second stage 104 and monitored by the first stage 102, or addressed directly to the first stage 102 as explained above. In either case, the overall efficiency of the DC/DC converter 100 can be increased under light-load conditions.

Figure 4:
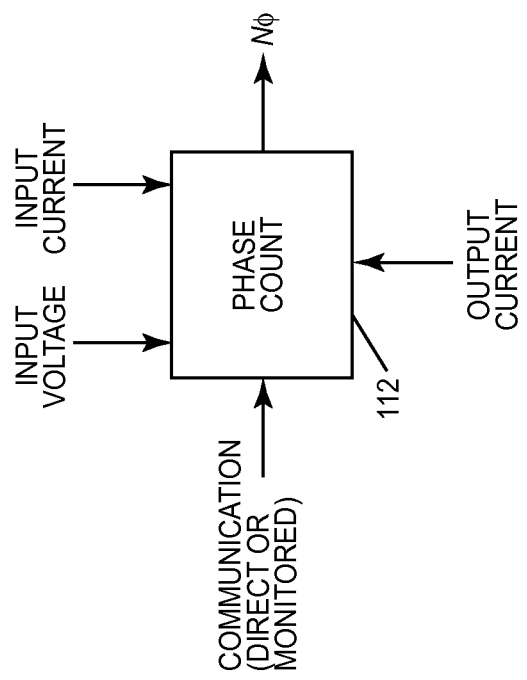
FIGS. 4 through 6 illustrate different variables that affect each operating point variable shown in FIG. 3.
Figure 5:
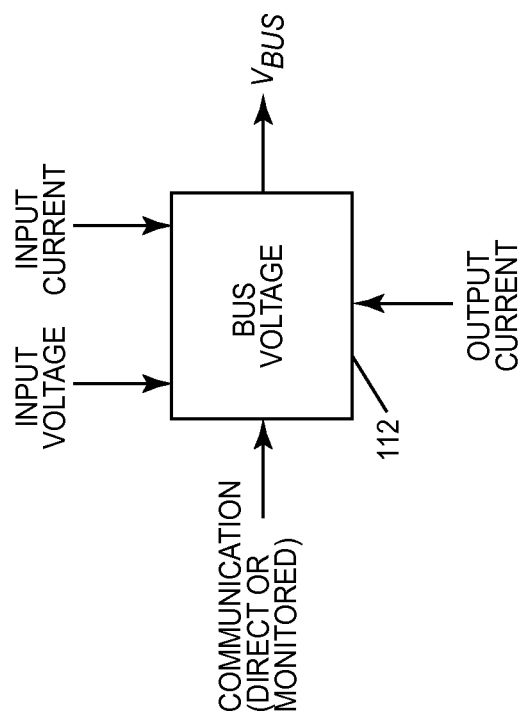
Figure 6:
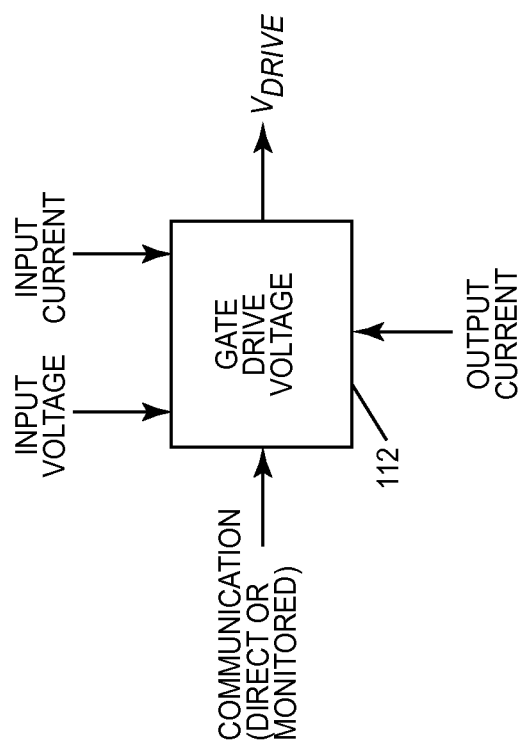

FIGS. 4 through 6 illustrate the variables that affect each operating point variable shown in FIG. 3.

According to FIG. 4, the first stage 102 of the DC/DC converter 100 has a plurality of phases (power stages) 110 each of which has a programmed phase current limit for protection. The controller 112 of the first stage 102 can monitor commands addressed to the second stage 104 that affect the number of active phases Nϕ for the second stage 104, or receive the same or similar commands directly from the load 106. The controller 112 can optimize efficiency while assuming safe operation by measuring input voltage, input current and output current of the first stage 102. For example, two phases 110 of the first stage 102 may be active at some operating point, but one phase 110 can handle the load current demand. In this case the controller 112 can switch to one phase 110 if safe and more efficient than two phases 110, based on the input power and output current measurements.

According to FIG. 5, the output voltage (VR2) of the first stage 102 can be adjusted and its impact on efficiency determined by measuring the input power and output current of the first stage 102. The controller 112 of the first stage 102 can monitor output current for protection and the possibility of phase count increase. For a given power level, reduction of the output voltage VR2 may increase the efficiency of the downstream second stage 104 but lower the efficiency of the first stage 102. Or reduction of the output voltage VR2 may increase both efficiencies, or decrease both. Output voltage adjustments are very dependent on the converter implementation, but in general the controller 112 can adjust the output voltage VR2 of first stage 102 to increase overall efficiency of the DC/DC converter 100.

According to FIG. 6, the voltage of the signals (Vdrive) used to drive the gates of the power transistors of the first stage 102 can be adjusted to improve overall system efficiency. For example, it may be beneficial to reduce the gate drive voltage under lower load power conditions as indicated by measuring the input power and output current of the first stage 102. However, the first stage 102 output current need not necessarily be measured or sensed.

The way in which the first stage 102 of the DC/DC converter 100 implements operating set point changes depends on the architecture of the first stage 102. In one embodiment, the first stage 102 is hard-wired with different operating set point options. Each of the hard-wired operating set point options corresponds to a different power mode of the first stage 102. According to this embodiment, the first stage 102 selects the operating set point option associated with a corresponding command issued by the load 106. The command can be addressed to the second stage 104 and monitored by the first stage 102, or addressed directly to the first stage 102 as explained above.

In another embodiment, the different operating set point options available to the first stage 102 of the DC/DC converter 100 are stored in registers 200 of the system in which the DC/DC converter 100 is included e.g. as shown in FIG. 2. The first stage 102 changes its operating set point responsive to a command issued by the load 106, in accordance with the register settings 200 which are accessible by the first stage 102.

In yet another embodiment, the first stage 102 develops a history of power mode behavior by monitoring prior activity on the second DC voltage rail VR2 in response to different commands issued by the load 106. The first stage 102 then determines whether to change its operating set point based at least partly on the history of power mode behavior.

The DC/DC converter 100 can use its current monitoring pin (IMON) with knowledge of the load power state to implement an adaptive filter that determines the threshold and delays required for the first stage 102 of the DC/DC converter 100 to safely enter and exit a power saving state. Then the power state commands for the second stage 104 of the DC/DC converter 100 need only be required for a few power state transitions until the controller 112 of the first stage 102 learns the behavior of the load 106 during each power state via the current monitoring pin.

The DC/DC voltage converter 100 can communicate with electronic components other than a CPU, e.g. including memory, graphics, I/O, and other electronic components. For example in a server environment, there can be as many as six voltage rails or more which are controlled by a CPU on a single board.

Figure 7:
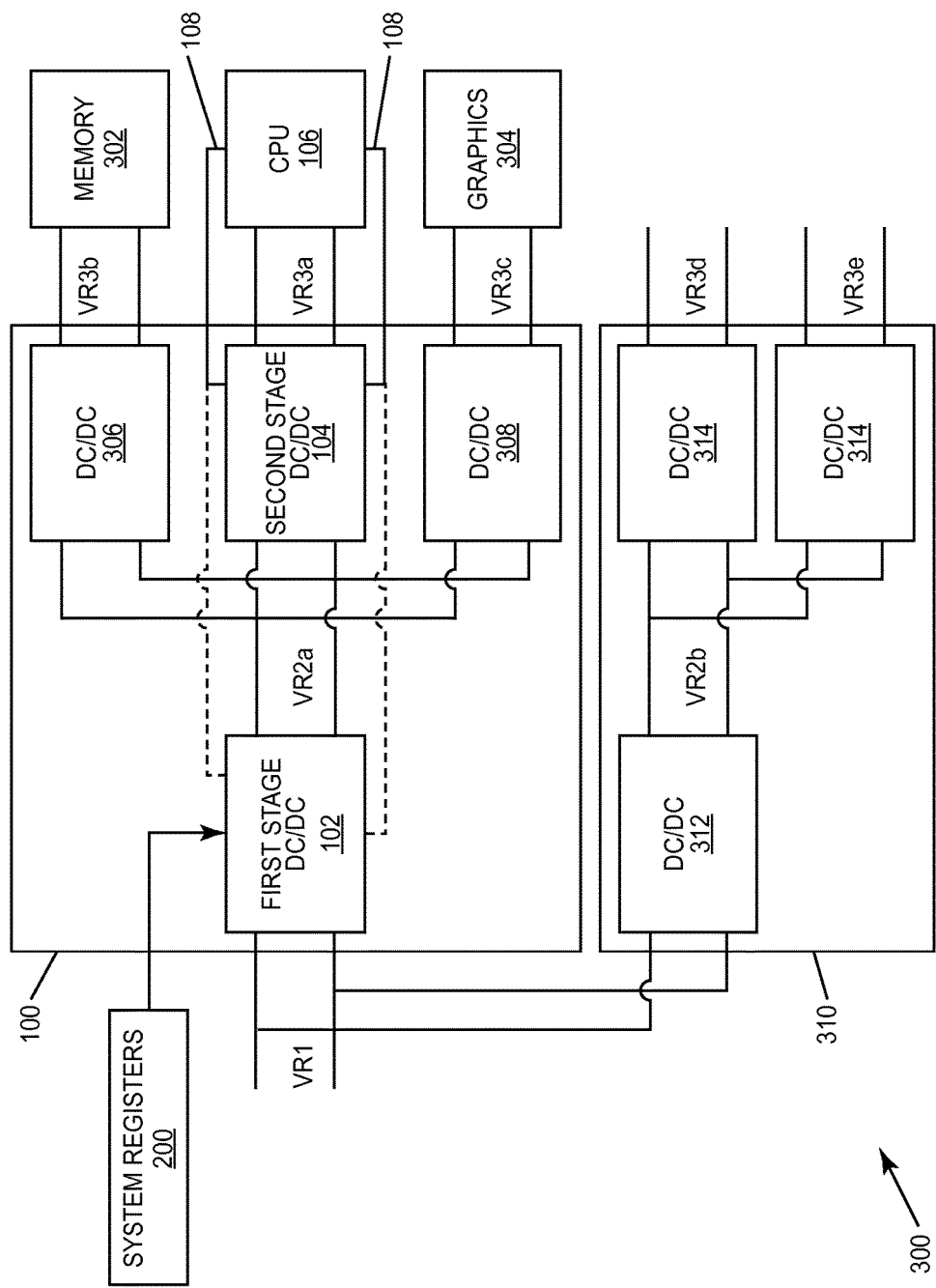
FIG. 7 illustrates a block diagram of an embodiment of a server that includes a DC/DC converter having a first stage for converting a high bus voltage to an intermediate bus voltage and a second stage for converting the intermediate bus voltage to a low bus voltage that supplies a load.

FIG. 7 illustrates an embodiment of a server 300 that includes a first DC/DC converter 100 of the kind previously described herein that provides an intermediate voltage rail VR2a for powering all voltage rails VR3a, VR3b, VR3c that supply electronic components in communication with the CPU 106. For example, the server 300 can include memory 302 such as volatile and/or nonvolatile memory and graphics logic 304 such as a graphics processor coupled to the CPU 106. The first DC/DC voltage converter 100 powers the CPU 106 and each electronic component 302, 304 that communicates with the CPU 106. A communication bus 108 couples the CPU 106 to the first DC/DC converter 100, memory 302, graphics logic 304, etc. A DC voltage distribution bus (rail) VR1 is coupled to the first DC/DC voltage converter 100.

The first DC/DC voltage converter 100 also includes an additional stage 306, 308 for converting the second DC voltage rail VR2a to an additional DC voltage rail VR3b, VR3c lower than the second DC voltage rail VR2a and different than the third DC voltage rail VR3a. Each additional stage 306, 308 delivers current to an electronic component 302, 304 other than the CPU 106 at the corresponding additional DC voltage rail VR3b, VR3c, where the amount of current delivered to each of these electronic component(s) 302, 304 corresponds to an operating set point of the corresponding additional stage 306, 308 of the first DC/DC converter 100. Each additional stage 306, 308 of the first DC/DC converter 100 can change its operating set point responsive to a command received from the load 106 and addressed to that stage 306, 308, such that the amount of current delivered to the corresponding electronic component 302, 304 is reduced.

The first stage 102 of the first DC/DC converter 100 can be responsible for multiple voltage rails VR3a, VR3b, VR3c, and therefore the decision making process of the first stage 102 becomes more complex. For example, the first stage 102 can monitor for multiple addresses (one for each rail/component) and make a decision for all downstream voltage rails VR3a, VR3b, VR3c. The first stage 102 should be able to support the worst operating point for each voltage rail VR3a, VR3b, VR3c. The electronic components 106, 302, 304 supplied by the first DC/DC converter 100 may not all be at same power levels. For example, the CPU 106 can be in a lower power state than the graphics processor 304.

In general, the first stage 102 of the first DC/DC converter 100 can change its operating set point responsive to commands issued by the CPU 106 to the downstream stages 104, 306, 308, or responsive to a command issued by the CPU 106 directly to the first stage 102. For example, the first stage 102 of the first DC/DC converter 100 can monitor communication between the CPU 106 and each stage 104, 306, 308 of the first DC/DC converter 100 downstream of the first stage 102, or the first stage 102 can communicate directly with the CPU 106. The dashed lines in FIG. 7 indicate that the first stage 102 of the first DC/DC converter 100 can monitor the communication bus 108 between the CPU 106 and each downstream stage 104, 306, 308 of the first DC/DC converter 100, or receive packets from the CPU 106 over the communication bus 108 that are uniquely addressed to the first stage 102, in order to gain insight into the power consumption behavior of the CPU 106. In either case, the ability to enter a power saving mode is then calculated by the first stage controller 112 of the first DC/DC converter 100 based on knowledge of the rated power of the different downstream voltage rails VR3a, VR3b, VR3c.

Exiting to the maximum power state depends on the capability of the first stage 102 of the first DC/DC converter 100 and capabilities of the voltage rail(s) VR3a, VR3b, VR3c that have also been instructed to leave power saving modes. For example, the first stage 102 can change its operating set point by shedding one or more phases 110, each phase 110 configured to output a maximum rated current at VR2a, based on the operating set point of one or more downstream converter stages 104, 306, 308. In another embodiment, the first stage 102 of the first DC/DC converter 100 can change its operating set point by changing from a PWM operating mode to a PFM mode for one or more of the phases 110. In yet another embodiment, the first stage 102 of the first DC/DC converter 100 can change its operating set point by changing the gate drive signal (Vdrive) applied to the power transistors of one or more phases 110 of the first stage 102. In still another embodiment, the first stage 102 of the first DC/DC converter 100 can change its operating set point by changing the level of the second DC voltage rail VR2a provided by the first stage 102 to the downstream stages 104, 306, 308.

The server 300 also includes a second DC/DC converter 310 that provides an intermediate voltage rail VR2b for powering the voltage rails VR3d, VR3e that supply electronic components that are not in direct communication with the CPU 106. The same or different DC voltage distribution bus (rail) VR1 is coupled to both the first and second DC/DC voltage converters 100, 310. The second DC/DC converter 310 can have one or more stages 312, 314 in series. Any standard converter can be used as the second DC/DC converter 310.

The way in which the first stage 102 of the first DC/DC converter 100 implements operating set point changes depend on the architecture of the first stage 102 as previously described herein. For example, the first stage 102 can be hard-wired with different operating set point options each of which corresponds to a different power mode of the first stage 102. The first stage 102 selects the operating set point option associated with a corresponding command issued by the load 106. In another example, the different operating set point options available to the first stage 102 of the first DC/DC converter 100 are stored in registers 200 of the server 300. The first stage 102 changes its operating set point responsive to a command issued by the load 106, in accordance with the register settings 200 which are accessible by the first stage 102. In yet another example, the first stage 102 of the first DC/DC converter 100 develops a history of power mode behavior by monitoring prior activity on the second DC voltage rail VR2a in response to different commands issued by the load 106. The first stage 102 then determines whether to change its operating set point based at least partly on the history of power mode behavior. The observed power mode behavior can include power mode behavior for all electronic components 302, 304 that are in communication with the CPU 106.

Terms such as "first", "second", and the like, are used to describe various elements, regions, sections, etc. and are also not intended to be limiting. Like terms refer to like elements throughout the description.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise.

It is to be understood that the features of the various embodiments described herein may be combined with each other, unless specifically noted otherwise.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A DC/DC voltage converter, comprising:
   a first stage comprising one or more phases and a controller for controlling operation of the one or more phases of the first stage, the first stage operable to convert a first DC voltage rail to a second DC voltage rail different than the first DC voltage rail; and
   a second stage comprising one or more phases and a controller for controlling operation of the one or more phases of the second stage, the second stage operable to convert the second DC voltage rail to a third DC voltage rail lower than the second DC voltage rail and deliver current to a load at the third DC voltage rail, the amount of current delivered to the load corresponding to an operating set point of the second stage,
   wherein the controller of the second stage is operable to change the operating set point of the second stage responsive to a command addressed to the second stage by the load, such that the amount of current delivered to the load is modified,
   wherein the controller of the first stage is operable to change an operating set point of the first stage responsive to the command addressed to the second stage by the load independent of the operating set point change made by the controller of the second stage, such that the amount of current delivered to the second stage is modified,
   wherein the DC/DC voltage converter further comprises a communication bus for carrying the command addressed to the second stage, the communication bus being separate from the third DC voltage rail over which the second stage delivers current to the load.

2. The DC/DC voltage converter of claim 1, wherein the first stage is operable to monitor the communication bus for the command addressed to the second stage.

3. The DC/DC voltage converter of claim 1, wherein the controller of the first stage is operable to change the operating set point of the first stage responsive to the command addressed to the second stage by the load by shedding one or more of the phases of the first stage, each phase configured to output a maximum rated current at the second DC voltage rail.

4. The DC/DC voltage converter of claim 1, wherein the controller of the first stage is operable to change the operating set point of the first stage responsive to the command addressed to the second stage by the load by changing from a pulse width modulation operating mode to a pulse frequency modulation operating mode.

5. The DC/DC voltage converter of claim 1, wherein the controller of the first stage is operable to change the operating set point of the first stage responsive to the command addressed to the second stage by the load by changing a gate drive signal applied to one or more of the phases of the first stage.

6. The DC/DC voltage converter of claim 1, wherein the controller of the first stage is operable to change the operating set point of the first stage responsive to the command addressed to the second stage by the load by changing a level of the second DC voltage rail.

7. The DC/DC voltage converter of claim 6, wherein the first stage is operable to increase or decrease the level of the second DC voltage rail responsive to the second stage being instructed by the load to shed one or more of its phases, each phase of the second stage configured to output a maximum rated current at the third DC voltage rail.

8. The DC/DC voltage converter of claim 1, wherein the first stage is hard-wired with different operating set point options, each operating set point option corresponding to a different power mode of the first stage, and wherein the controller of the first stage is operable to select the operating set point option associated with the command addressed to the second stage by the load.

9. The DC/DC voltage converter of claim 1, wherein the first stage is operable to develop a history of power mode behavior by monitoring prior activity on the second DC voltage rail in response to different commands issued by the load over the communication bus, and wherein the controller of the first stage is operable to determine whether to change the operating set point of the first stage based on the history of power mode behavior.

10. The DC/DC voltage converter of claim 1, wherein the controller of the first stage is operable to change the operating set point of the first stage responsive to the command addressed to the second stage by the load, in accordance with register settings accessible by the controller of the first stage.

11. The DC/DC voltage converter of claim 1, further comprising:
a third stage comprising one or more phases and a controller for controlling operation of the one or more phases of the third stage, the third stage operable to convert the second DC voltage rail to a fourth DC voltage rail lower than the second DC voltage rail and different than the third DC voltage rail, and deliver current to an electronic component other than the load at the fourth DC voltage rail, the amount of current delivered to the electronic component corresponding to an operating set point of the third stage,
wherein the controller of the third stage is operable to change the operating set point of the third stage responsive to a command received from the load, such that the amount of current delivered to the electronic component is reduced,
wherein the controller of the first stage is operable to change the operating set point of the first stage responsive to commands received by the second and third stages and independent of the operating set point changes made by the controllers of the second and the third stages.

12. The DC/DC voltage converter of claim 1, wherein the first DC voltage rail is at 48V and the second DC voltage rail is at 12V.

13. The DC/DC voltage converter of claim 1, wherein the first stage is further operable to monitor communications between the load and the second stage.

14. The DC/DC voltage converter of claim 13, wherein the first stage is operable to monitor communications between the load and the second stage based on monitoring the communication bus between the load and the second stage.

15. The DC/DC voltage converter of claim 1, wherein the first stage does not directly communicate with the load.

16. The DC/DC voltage converter of claim 1, wherein the first stage comprises a plurality of phases each of which is individually controllable by the controller of the first stage, and wherein the second stage comprises a plurality of phases each of which is individually controllable by the controller of the second stage.

17. A server, comprising:
a central processing unit (CPU);
memory coupled to the CPU;
a DC/DC voltage converter for powering the CPU and the memory;
a communication bus for coupling the CPU to the memory and the DC/DC voltage converter; and
a DC voltage distribution bus coupled to the DC/DC voltage converter,
wherein the DC/DC voltage converter comprises:
a first stage comprising one or more phases and a controller for controlling operation of the one or more phases of the first stage, the first stage operable to convert a first DC voltage rail provided by the DC voltage distribution bus to a second DC voltage rail different than the first DC voltage rail; and
a second stage comprising one or more phases and a controller for controlling operation of the one or more phases of the second stage, the second stage operable to convert the second DC voltage rail to a third DC voltage rail lower than the second DC voltage rail and deliver current to the CPU at the third DC voltage rail, the amount of current delivered to the CPU corresponding to an operating set point of the second stage,
wherein the controller of the second stage is operable to change the operating set point of the second stage responsive to a command addressed to the second stage by the CPU, such that the amount of current delivered to the CPU is modified,
wherein the controller of the first stage is operable to change an operating set point of the first stage responsive to the command addressed to the second stage by the load independent of the operating set point change made by the controller of the second stage, such that the amount of current delivered to the second stage is modified, wherein the communication bus is for carrying the command addressed to the second stage, the communication bus being separate from the third DC voltage rail over which the second stage delivers current to the load.

18. The server of claim 17, wherein the first stage is operable to monitor the communication bus for the command addressed to the second stage.

19. The server of claim 17, wherein the controller of the first stage is operable to change the operating set point of the first stage responsive to the command addressed to the second stage by the CPU by shedding one or more of the phases of the first stage, each phase configured to output a maximum rated current at the second DC voltage rail.

20. The server of claim 17, wherein the controller of the first stage is operable to change the operating set point of the first stage responsive to the command addressed to the second stage by the CPU by changing from a pulse width modulation operating mode to a pulse frequency modulation operating mode.

21. The server of claim 17, wherein the controller of the first stage is operable to change the operating set point of the first stage responsive to the command addressed to the second stage by the CPU by changing a gate drive signal applied to one or more of the phases of the first stage.

22. The server of claim 17, wherein the controller of the first stage is operable to change the operating set point of the first stage responsive to the command addressed to the second stage by the CPU by changing a level of the second DC voltage rail.

23. The server of claim 22, wherein the first stage is operable to increase or decrease the level of the second DC voltage rail responsive to the second stage being instructed by the CPU to shed one or more of its phases, each phase of the second stage configured to output a maximum rated current at the third DC voltage rail.

24. The server of claim 17, wherein the first stage is hard-wired with different operating set point options, each operating set point option corresponding to a different power mode of the first stage, and wherein the controller of the first stage is operable to select the operating set point option associated with the command addressed to the second stage by the CPU.

25. The server of claim 17, wherein the first stage is operable to develop a history of power mode behavior of the DC/DC voltage converter by monitoring prior activity on the second DC voltage rail in response to different commands issued by the CPU, and wherein the controller of the first stage is operable to determine whether to change the operating set point of the first stage based on the history of power mode behavior.

26. The server of claim 17, wherein the controller of the first stage is operable to change the operating set point of the first stage responsive to the command addressed to the second stage by the CPU, in accordance with register settings of the server that are accessible by the controller of the first stage.

27. The server of claim 17, wherein:
the DC/DC voltage converter further comprises a third stage comprising one or more phases and a controller for controlling operation of the one or more phases of the third stage, the third stage operable to convert the second DC voltage rail to a fourth DC voltage rail lower than the second DC voltage rail and different than the third DC voltage rail, and deliver current to the memory at the fourth DC voltage rail, the amount of current delivered to the memory corresponding to an operating set point of the third stage;
the controller of the third stage is operable to change the operating set point of the third stage responsive to a command received from the CPU, such that the amount of current delivered to the memory is reduced; and
the controller of the first stage is operable to change the operating set point of the first stage responsive to commands received by the second and third stages from the CPU and independent of the operating set point changes made by the controllers of the second and the third stages.

28. The server of claim 17, wherein the first stage comprises a plurality of phases each of which is individually controllable by the controller of the first stage, and wherein the second stage comprises a plurality of phases each of which is individually controllable by the controller of the second stage.

* * * * *